United States Patent
Childs et al.

(10) Patent No.: US 9,875,640 B2
(45) Date of Patent: Jan. 23, 2018

(54) METHOD AND SYSTEM FOR MANAGING PLANT ALARM SYSTEMS

(71) Applicant: General Electric Company, Schenectady, NY (US)

(72) Inventors: Lester Dwine Childs, Greer, SC (US); Gautam Chatterji, Clifton Park, NY (US); Benjamin Hubert Fricaud, Belfort (FR); George Francis Pardee, Glenville, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/092,890

(22) Filed: Apr. 7, 2016

(65) Prior Publication Data
US 2016/0300475 A1    Oct. 13, 2016

Related U.S. Application Data

(60) Provisional application No. 62/144,599, filed on Apr. 8, 2015.

(51) Int. Cl.
G08B 25/00 (2006.01)
G05B 23/02 (2006.01)

(52) U.S. Cl.
CPC ......... *G08B 25/00* (2013.01); *G05B 23/0278* (2013.01)

(58) Field of Classification Search
None
See application file for complete search history.

(56) References Cited

U.S. PATENT DOCUMENTS

| | | | | |
|---|---|---|---|---|
| 4,543,567 A * | 9/1985 | Shirata | ................... | G08B 23/00 340/506 |
| 5,167,010 A * | 11/1992 | Elm | ..................... | G05B 13/028 376/259 |
| 6,690,274 B1 * | 2/2004 | Bristol | ............... | G05B 23/0267 340/506 |
| 7,103,427 B2 | 9/2006 | Dillon | | |
| 7,634,384 B2 | 12/2009 | Eryurek et al. | | |

(Continued)

FOREIGN PATENT DOCUMENTS

| | | |
|---|---|---|
| JP | H06103476 A | 4/1994 |
| JP | 2013105291 A | 5/2013 |
| WO | 2014129983 A1 | 8/2014 |

OTHER PUBLICATIONS

PCT Search Report and Written Opinion issued in connection with corresponding PCT Application No. PCT/US2016/026612 dated Jun. 7, 2016.

*Primary Examiner* — Brent Swarthout
(74) *Attorney, Agent, or Firm* — Armstrong Teasdale LLP

(57) ABSTRACT

A system and method of managing notifications of a plurality of states of a plant of equipment are provided. The alarm system includes a memory device and one or more processors communicatively coupled to the memory device. The one or more processors are programmed to receive parameters relating to a potential alarm, receive an indication of a plant event from at least one of a plurality of field devices, compare the received indication to the received parameters, and display a notification of the potential alarm as at least one of an event, a diagnostic, an alert, and an alarm based on the comparison and in accordance with the received parameters.

6 Claims, 10 Drawing Sheets

(56) References Cited

U.S. PATENT DOCUMENTS

| | | | |
|---|---|---|---|
| 7,652,567 B2 * | 1/2010 | Murayama | G05B 19/409 |
| | | | 340/517 |
| 7,953,503 B2 | 5/2011 | Thurau | |
| 8,044,793 B2 | 10/2011 | Eryurek et al. | |
| 8,103,438 B2 | 1/2012 | Petrie et al. | |
| 8,239,125 B2 | 8/2012 | Petrie et al. | |
| 8,620,618 B2 | 12/2013 | Eryurek et al. | |
| 8,648,910 B2 | 2/2014 | Heydlauf | |
| 2004/0103165 A1 | 5/2004 | Nixon et al. | |
| 2006/0168013 A1 * | 7/2006 | Wilson | G05B 19/4184 |
| | | | 709/206 |
| 2006/0190584 A1 | 8/2006 | Skold et al. | |
| 2013/0021355 A1 | 1/2013 | Ramarao et al. | |
| 2014/0019092 A1 | 1/2014 | Phelps et al. | |
| 2014/0121789 A1 | 5/2014 | Brandes et al. | |
| 2014/0208253 A1 | 7/2014 | Pettus et al. | |
| 2015/0061860 A1 * | 3/2015 | Pariyani | G05B 23/024 |
| | | | 340/501 |

* cited by examiner

| Potential cause of the alarm | Operator action |
|---|---|
| 1) Pressure sensor fault<br>2) Lube oil pump failure<br>3) Lube oil header pipe broken | 1) Re-calibrate or change pressure sensor<br>2) Check the current on the motor of the pump<br>3) Stop the unit and repair the leakage |

OPERATOR GUIDANCE FORMAT FOR ALARM

| ALARM NAME | ALARM DESCRIPTION | | |
|---|---|---|---|
| L96WW3L_ALM | On line water wash sequence stopped due to very low pressure on the online manifold | | |
| ALARM CLASS | PLANT AREA | | |
| LVL_3 | Water wash system | | |
| | OPERATOR URGENCY | | |
| | Not Urgent (>30 mins) | | |
| SHELVING AUTHORIZED | SHELVING MAXIMUM DURATION | PARENT LIST | CHILD LIST |
| YES | 300 MINUTES | L96WWP1L ALM<br>L33VA136C ALM | L4WWON ALM<br>L4GRID ALM |

POTENTIAL CAUSES
1) Bad VPR74-1 setting
2) Bad position of a manual valve on the online line
3) Low inlet pressure at the inlet of the water wash skid
4) Bad water wash pump operation
5) Bad 96WW-3 transmitter feedback

OPERATOR ACTION
1) Check setting of VPR74-1
2) Check that all valves on the line are fully open during the online sequence
3) Check that water pressure is 3 bar at water wash pump inlet
4) Check water pressure at pump outlet (should be at least 8bar)
5) Measure pressure at 96WW-3 transmitter to confirm its calibration

CONSEQUENCE OF INACTION

Unit has no more capability to sustain grid code event.

FIG. 5

PRIORITIZATION OF THE ALARM ANNUNCIATION TYPE - ALARM CLASS DEFINITION -

| Consequence Area | CONSEQUENCE OF INACTION CATEGORY | | | |
|---|---|---|---|---|
| | Consequence Category 1: Minor | Consequence Category 2: Major | Consequence Category 3: Severe | Consequence Category 4: Personnel |
| Health & Safety | None | None | None | Any Personnel Health & Safety consequence |
| Environmental | Minor Issue that results in no agency notification, permit violation or fine | Issue that results in agency notification, permit violation or fine | Significant release with serious offsite impact | Any environmental consequence on Personnel |
| Financial | Total Financial Impact*** < $50K | Total Financial Impact*** of $50K to $500K | Total Financial Impact*** of > $500K | Any Financial consequence on Personnel |
| | Consequence of Inaction Category: Corresponds to the worst category assessed through the 3 Consequence Areas (Health & Safety, Environmental and Financial) | | | |
| | ALARM CLASS** | | | |
| Operator Urgency* | | | | |
| Not Urgent (> 30 mins) | LVL_3 (Low Priority) | LVL_2 | LVL_2 | LVL_1 |
| Prompt (15 to 30 mins) | LVL_3 (Low Priority) | LVL_2 | LVL_1 | LVL_1 |
| Rapid (5 to 15 mins) | LVL_2 (Med Priority) | LVL_1 | LVL_1 | LVL_1 |
| Immediate (< 5 mins) | LVL_1 (High Priority) | LVL_1 | LVL_1 | LVL_1 |

FIG. 7

PRIORITIZATION OF THE ALARM ANNUNCIATION TYPE
-- ALARM CLASS DEFINITION --
EXAMPLE

| Consequence Area | Consequence Category 1: Minor | Consequence Category 2: Major | Consequence Category 3: Severe | Consequence Category 4: Personnel |
|---|---|---|---|---|
| Health & Safety | None | None | None | Any Personnel Health & Safety consequence |
| Environmental | Minor Issue that results in no agency notification, permit violation or fine | Issue that results in agency notification, permit violation or fine | Significant release with serious offsite impact | Any environmental consequence on Personnel |
| Financial | Total Financial Impact*** < $50K | Total Financial Impact*** of $50K to $500K | Total Financial Impact*** of > $500K | Any Financial consequence on Personnel |

| | | ALARM CLASS** | | |
|---|---|---|---|---|
| Operator Urgency* | | | | |
| Not Urgent (> 30 mins) | LVL_3 | LVL_2 | LVL_2 | LVL_1 |
| Prompt (15 to 30 mins) | LVL_3 | LVL_2 | LVL_1 | LVL_1 |
| Rapid (5 to 15 mins) | LVL_1 | LVL_1 | LVL_1 | LVL_1 |
| Immediate (< 5 mins) | LVL_1 | LVL_1 | LVL_1 | LVL_1 |

Consequence of inaction Category:
Corresponds to the worst category assessed through the 3 Consequence Areas (Health & Safety, Environmental and Financial)

FIG. 8

METHOD AND SYSTEM FOR MANAGING PLANT ALARM SYSTEMS

CROSS REFERENCE TO RELATED APPLICATIONS

This application claims priority to and the benefit of the filing date of U.S. Provisional Application No. 62/144,599 filed on Apr. 8, 2015, which is hereby incorporated by reference in its entirety.

BACKGROUND

This description relates to process system warnings, and, more particularly, to rationalizing alarms that are displayed to operators of plant equipment during operational events.

At least some known process plant control room annunciator displays include many tens and sometimes hundreds of possible individual notifications. Typically operators acknowledge receipt of such notifications and initiate a predetermined corrective action to clear the annunciator display of outstanding notifications. During normal operations, such notifications may occur at such a periodicity that the operator can easily evaluate the notification in the context of current plant operations and determine a cause of the notification. However, during some plant events, so many notifications may be annunciated simultaneously that the operator may be overloaded with relatively less important notifications occurring at the same time as more important notifications.

BRIEF DESCRIPTION

In one aspect, an alarm system for managing notifications of a plurality of states of a plant of equipment is provided. The alarm system includes a memory device and one or more processors communicatively coupled to the memory device. The one or more processors programmed to receive parameters relating to a potential alarm, receive an indication of a plant event from at least one of a plurality of field devices, compare the received indication to the received parameters, and display a notification of the potential alarm as at least one of an event, a diagnostic, an alert, and an alarm based on the comparison and in accordance with the received parameters.

In another aspect, a plant annunciation system for rationalizing alarms associated with a plurality of equipment includes a rationalized alarm system including one or more processors communicatively coupled to one or more memory devices, a plurality of field devices including at least one of a sensor, a virtual sensor, a control device, a controlled device, and a network configured to communicate with the rationalized alarm system to indicate a fault within at least one of the system hardware, software or plant components, and a human machine interface (HMI) including at least one display of a rationalized alarm, the HMI configured to reduce an operator sensory load by reducing annunciated alarms to those that have been designed, categorized, and prioritized using the rationalized alarm system.

In yet another aspect, a computer-implemented method of managing notifications of a plurality of states of a plant of equipment includes receiving a notification of a potential alarm, determining if the potential alarm meets criteria of being an alert or alarm, determining if the potential alarm is at least one of meaningful, unique, and abnormal, and determining operator guidance for the potential alarm including determining at least one of a probable cause for the potential alarm, a consequence of inaction upon notification of the potential alarm, an operator action for mitigating an effect of the cause of the potential alarm and an operator urgency for responding to the potential alarm.

BRIEF DESCRIPTION OF THE DRAWINGS

FIGS. 1-10 show example embodiments of the method and system described herein.

FIG. 1 is a flow chart of a method of an alarm rationalization process in accordance with an example embodiment of the present disclosure.

FIG. 2 is a screen capture of a plant area display in accordance with an example embodiment of the present disclosure.

FIG. 3 is a hierarchical alarm tree illustrating relationships between parent and child alarms in accordance with an example embodiment of the present disclosure.

FIG. 5 is a screen capture of a format of an operator guidance for alarm display that is used to set a parameters for a display such as shown in FIG. 4B.

FIG. 6 is a data flow diagram of the alarm prioritization process shown in FIG. 1.

FIG. 7 is a severity matrix for use in determining alarm priority.

FIG. 8 is an example severity matrix illustrating prioritization of a potential alarm.

FIG. 9 is a human machine interface display illustrating a use of priority in an HMI display.

FIG. 10 is a diagram of example computing devices that may be used in the process shown in FIG. 1.

Figure 1:
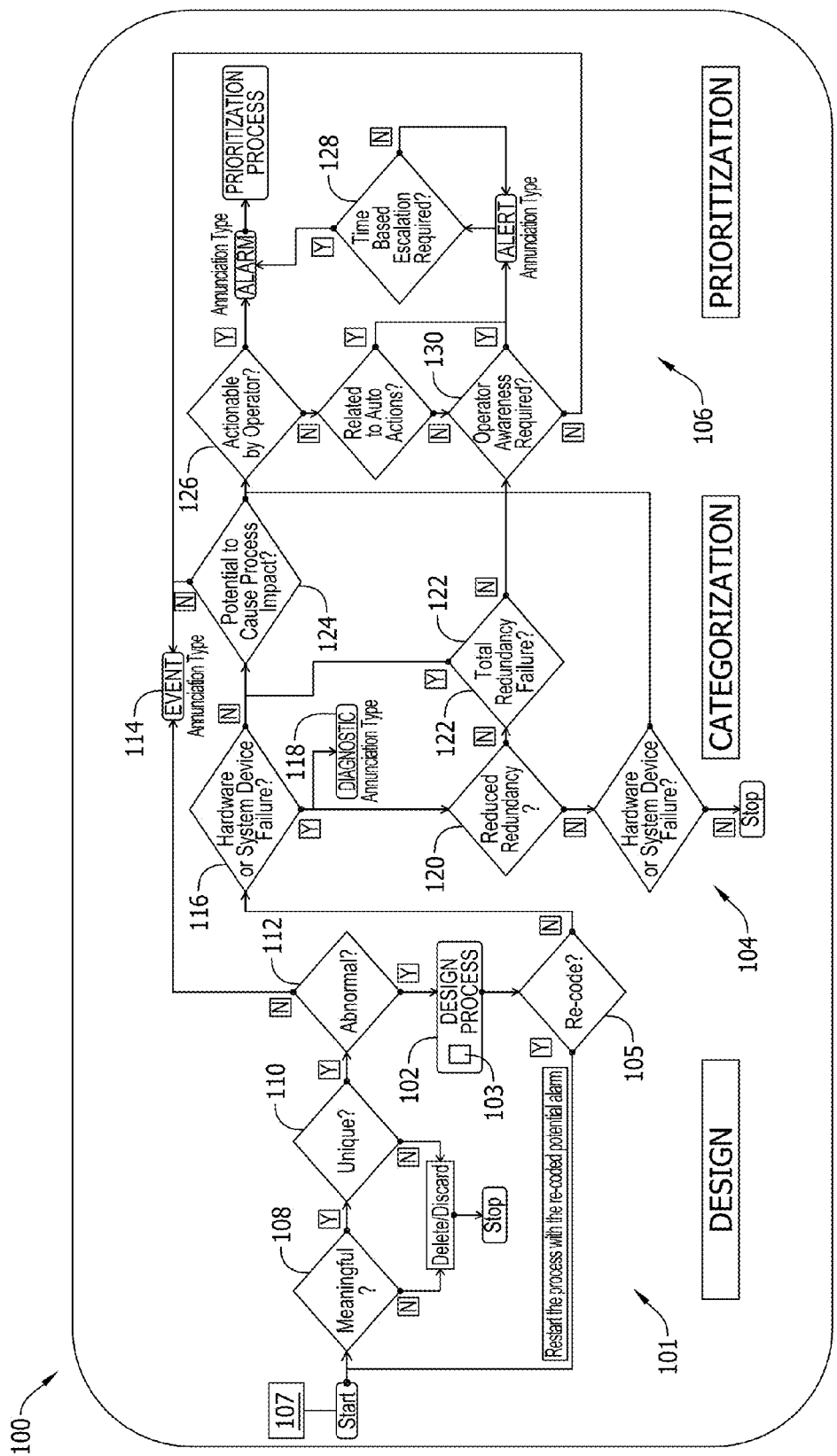

Although specific features of various embodiments may be shown in some drawings and not in others, this is for convenience only. Any feature of any drawing may be referenced and/or claimed in combination with any feature of any other drawing.

Unless otherwise indicated, the drawings provided herein are meant to illustrate features of embodiments of the disclosure. These features are believed to be applicable in a wide variety of systems including one or more embodiments of the disclosure. As such, the drawings are not meant to include all conventional features known by those of ordinary skill in the art to be required for the practice of the embodiments disclosed herein.

DETAILED DESCRIPTION

The following detailed description illustrates embodiments of the disclosure by way of example and not by way of limitation. It is contemplated that the disclosure has general application to analytical and methodical embodiments of managing annunciator systems in industrial, commercial, and residential applications.

Embodiments of an alarm management philosophy that includes alarm rationalization are described herein. The purpose of the rationalization process is to reduce the actionable alarms across the plant and improve operator effectiveness by offering substantial guidance and prioritization of items that require operator intervention to avoid consequence. Following the process also documents common alarm philosophy, definitions, rationale, and prioritization rules, including the display philosophy.

One of the main activities that is used to reduce a number of alarms presented to operators and to present the alarms to the operators in a contextual manner for timely action includes reducing the number of configured alarms that are presented to the operator during a plant event. As used herein, a plant event is a set of process parameters that change consistently together that are useful in isolating a cause of a failure or identifying an onset of a failure mode.

Plant alarms are an aggregate of component parts and systems; therefore, common philosophies and rationalization rules across all equipment in the plant is useful. In the example embodiment, the process includes elements, such as, but not limited to, design, categorization, and alarm prioritization. Steps of the process include categorizing potential alarms as Events, Diagnostics, Alerts or Alarms. The rationalization process makes use of an annunciation display philosophy and interaction strategy for operators and other plant personnel.

1) Primarily, operators will take actions on a priority basis to avoid process impact.

2) The live alarm display presents the alarms to the operator for their action with a priority that includes the urgency.

3) The live alert display presents items to the operator that requires their awareness, but are not directly actionable by them. These items may require the operator to communicate and collaborate with other personas to correct, i.e. maintenance.

4) The live diagnostics display and historical displays (Alarms, Alerts, Diagnostics, and Events) present items to the maintenance or plant engineer personnel for diagnoses of equipment failures and issues.

5) Alarms and Alerts are acknowledged by the operator.

6) Diagnostics and Events are typically acknowledged by the maintenance personnel.

7) Alerts also require operator acknowledgement; therefore, the Auto-Reset feature must be disabled on all Alerts.

This method will rationalize alarms and present only alarms to the operator for which they can take action and provide the specific action to take and the urgency with which they need to act to avoid the consequence of inaction. The process includes a method of designing, categorizing and prioritizing all of the data and behavior associated with alarms and the relationship between alarms (parent/child).

The following description refers to the accompanying drawings, in which, in the absence of a contrary representation, the same numbers in different drawings represent similar elements.

FIG. 1 is a flow chart of a method 100 of an alarm rationalization process in accordance with an example embodiment of the present disclosure. In the example embodiment, method 100 includes three processes including a design phase 101, a categorization phase 104, and a prioritization phase 106. In various embodiments, any of design phase 102, categorization phase 104, and prioritization phase 106 may be altered to accommodate different specification applications, for example, for different components or systems within a plant.

The alarm rationalization design phase challenges the rationale behind inclusion of potential alarms as actual alarms, alerts, and diagnostics. It requires component, system, and adjacent system level expertise to evaluate the design parameters of the potential alarm.

Alarm rationalization design phase 101 utilizes a design process 102 and also includes, for example, five phases:

1) Pre-check of all potential alarms in a system,
2) Alarm Definition,
3) Relationship of potential alarms within a given system,
4) Relationship of potential alarms to alarms in other/adjacent systems, and
5) Operator Guidance including a determination of the specific action to take and the urgency with which the operator needs to act to avoid the consequence of inaction 103.

The pre-checks are designed to determine if a potential alarm 107 meets the criteria of being an alert or an alarm or whether re-coding 105 is necessary. After any iterations of re-coding 105 are completed, the potential alarm is then re-evaluated again to ensure it is meaningful 108, unique 110, and/or abnormal 112. If potential alarm 107 is determined to be a plant event 114, no further rationalization is required.

Potential alarm 107 is evaluated for being meaningful 108, or whether it is relevant to process for normal or abnormal operations. Potential alarm 107 is also evaluated for being relevant to equipment condition whether in a positive aspect of a negative aspect to the condition. Potential alarm 107 is evaluated for being relevant to equipment state transition or change, whether the plant event helps clarify or guide operation and/or maintenance activity, and whether its description is meaningful to the operator.

When a notification is displayed, the text in the description:

1) Is focused on the probable cause or the sensed plant event.

2) Contains no more than 50 characters.

3) Contains no abbreviations and acronyms that are unrecognizable to the operator. Standard abbreviations used in the plant (like "HRSG") are acceptable.

4) Is formatted in normal sentence case, with the first word capitalized, acronyms capitalized, and everything else in lower case. No closing punctuation is to be used.

5) If the alarm is communicating a protective response to a fault, the text begins with that response, for example: "Trip-compressor stall detected."

6) Uses the term "trip" only to refer to a trip of the plant or the unit, not of systems at lower levels.

7) Does not contain the word "alarm."

Potential alarm 107 is evaluated for being unique 110, or non-duplicative from the operator view-point. For example, potential alarm 107 may be duplicative if the same data is coming from different sources, or the same type of alarm is coming from a macro or C-coded block, which may be duplicative. A determination is made as to whether potential alarm 107 is the best definition of the issue or if there is a better upstream or downstream plant event manifestation that is annunciated. If potential alarm 107 is an explicit hardware failure 116 or is not abnormal 112, its annunciation type will be diagnostic 118 or plant event 114 and does not factor into uniqueness tests with other potential alarms.

An alarm is not unique if it is time delayed between itself and another alarm that does not allow ample time for the operator to respond to the first alarm. (Allowable Response Time). An application code review is required to determine uniqueness of potential alarms across a system and/or related systems. The uniqueness test results in deletion or re-coding of potential alarms if they are determined to be not unique.

Potential alarm 107 is evaluated for being abnormal 112. As used herein, abnormal 112 is defined as any occurrence in the plant that can impact process, equipment or personnel safety leading to financial or efficiency loss or is outside of normal and expected control actions and operations.

Alarm definition includes defining a variable using a variable name, which is a name of potential alarm 107 under consideration, a design documentation reference, which refers to any and all documentation used to evaluate potential alarm 107 during the design 102, categorization 104, or prioritization phase 106, a description, which is meaningful, as described above, as well as being adherent to the text description rules described above.

The conditions of an alarm define the parameters which trigger it. During this phase of design 102, the active conditions are reviewed from a system standpoint to insure that there is no causal duplication (it is unique) and that potential alarm 107 is expressing the impact on the process and not trying to diagnose the problem. After the collaborative development of the alarm conditions, it is necessary to insure that the application code matches the defined conditions.

The following parameters are defined for each potential alarm 107:

Active Conditions: Operating conditions for which the alarm is applicable, i.e. equipment running or unit online, etc. Careful consideration is given when determining active conditions and it is recommended that a high level of system expertise is utilized when evaluating possible active conditions.

Triggering Event: Description of the logic that triggers potential alarm 107. When an alarm is triggered by a Boolean state, the alarm setpoint, alarm direction and alarm setpoint dead band parameters are not applicable.

Alarm Setpoint: Alarm setpoint is the threshold value that triggers a high or low alarm when exceeded. When an alarm is triggered by a setpoint, the triggering event parameter is not applicable.

Alarm Direction: Description of the threshold type exceeded, i.e. High, Low, High High, etc.

Alarm Setpoint Dead Band: The absolute value of the difference between the alarm threshold value and the alarm reset value. This value is set, at a minimum, to avoid chattering of analog type alarms.

Alarm Time Delay(s): The delay between the alarm trigger activation and generation of potential alarm 107. This value is set, at a minimum, to avoid noisy Boolean or analog type alarms.

Shelving is a mechanism, initiated by the operator, to temporarily suppress an alarm or alert. During design phase 102, the system owner and alarm rationalization team determine whether potential alarm 107 can be shelved. If it is allowed to be shelved, the maximum duration can also be determined. The maximum shelf time is reviewed against the allowable response time and urgency category described above.

Alarm Shelving: Rationalization parameter to determine shelving is enabled or disabled on a potential alarm.

Alarm Shelving Max Duration (minutes): If alarm shelving is enabled, this is the maximum time limit that the operator can shelve the alarm. The operator is also allowed to set a shorter time to shelve through the user interface, but not longer. The alarm suppression is removed when the shorter of the two times has expired.

Once potential alarm 107 has gone through design process 102, the next step is categorization process 104, which is the process of separating alarms into annunciation types based on common requirements. In the example embodiment, the annunciation types include Event, Diagnostic, Alert or Alarm. In other embodiments, other annunciation types may be used or added to the above list.

To support alarm categorization 104, the common requirement definitions include:

Actionable: Criteria for determining if potential alarm 107 is actionable or that the operator take an action to avoid/limit the consequence of a process impact 124. In the example embodiment, to be considered actionable requires an allowable response time (ART) (The maximum time between the annunciation of the alarm and the time the operator must take corrective action to avoid the consequence, typically two minutes at a minimum). For example, this is the time of response+time to bring back process in control.

An indirect or secondary operator action and/or a communication to maintenance for fixing equipment are not considered actionable for classification purposes.

Annunciation: An audible and/or visible means of indicating to the operator that calls attention to changes in process conditions. Annunciations include process Alarms, Alerts, Diagnostics and Events.

Allowable response time: The maximum time between the annunciation of the alarm and the time the operator must take corrective action to avoid the consequence.

Alarm Annunciation Type: Abnormality that is meaningful, unique 110, has potential to cause process impact 124, and is actionable by operator 126 within the allowable response time.

Alert Annunciation Type: Abnormality that is meaningful, unique, has potential to cause process impact, is not actionable by the operator, but requires the operator to be aware of the situation.

Diagnostic Annunciation Type: Any hardware failure of field device (sensor, virtual sensor, control device, controlled device, network, HMI or any annunciation generated by the control system to indicate a fault within the system hardware, software or components (e.g., communication error). This includes all smart device warnings or failure annunciations, i.e. Foundation Fieldbus device alerts.

Event Annunciation Type: A state or condition that is meaningful, unique, and not abnormal, but allows for ease of troubleshooting in understanding order of operation after an excursion. (ex. Valve open/close or Breaker open/close).

The criteria for determining whether the operator awareness is required 130 or potential alarm 107 has the potential to cause process impact 124 includes:

1) Whether the plant event leads to a loss of redundancy 120.
2) Whether the plant event leads to a loss of efficiency.
3) Whether the plant event leads to a reduction in plant output.
4) Whether the plant event leads to a process parameter exceeding control limits
5) Whether the plant event leads to damage to equipment.
6) Whether the plant event leads to sub-optimal operation.
7) Whether the plant event leads to an impending shutdown.
8) Whether the plant event leads to operating outside of regulatory/compliance limits/issues.

A Reduced Redundancy state 120 is defined by the failure of one or more instruments or hardware components that are participating in a redundancy scheme. In this state the process is operating normally with no impact to the process, but the lack of redundancy indicates that additional failure could produce process impacts, i.e. degraded operation or initiation of protective actions.

A Total Redundancy Failure state 122 is defined by the failure of usually two or more instruments or hardware components that are participating in a redundancy scheme. In this state, the process is in a degraded state or has been subjected to protective actions. Usually, bad or default values are being utilized at this time, forcing the system into a safe and/or degraded state. It may also potentially impact adjacent system operation.

A time based priority escalation 128 of the alarm or the alert is an alarm management technique that allows a new alarm to be generated based on time that indicates an imminent protective action. The escalated alarm must allow time for operator response or it will not be effective. There should also be a parent/child relationship of the two to avoid overload of information to the operator. This would need to be executed as separate variables with one being an alert/alarm and the other as an alert/alarm with a higher priority and they both need to be coded and in the rationalization table. Their descriptions serve very different purposes.

There are cases where alarm categorization process 104 uses an additional alarm or alert annunciate type generated in application code.

Diagnostic to Alert/Alarm-A potential alarm that is categorized as a diagnostic can also need to generate an alert or alarm, per alarm categorization process map. This would need to be executed as separate variables with one being a diagnostic and the other as an alert or alarm and they both need to be coded and in the rationalization table. Their descriptions serve very different purposes. The diagnostic description should indicate which equipment has failed. The alert or alarm should indicate which process is operating at a reduced or failed redundancy.

Example

One transmitter out of a median selected set of transmitters fails.

A bad quality diagnostic is generated for the failed transmitter with a description indicating exactly which device failed.

In this case, the process continues to operate normally on the other two transmitters in reduced redundancy state 120 and there is no operator action to be taken. The operator needs to be aware of the situation because the next failure will have an impact on the process.

An alert is generated for the process with a description that this particular process is in reduced redundancy state 120.

The maintenance person needs to know which transmitter to fix (diagnostic), the operator needs to know which process is at risk of impact with one more failure (alert).

Example

The loss of communication with the gas chromatograph has a process impact. Immediately after the loss of communication, the gas turbine runs on an assumed gas composition value.

The issues to this point will follow the example of the diagnostic to alert/alarm. The loss of communication is a diagnostic with description that denotes which equipment is having issues. The degraded operation is an alert to the operator with a description of the degraded operation.

In some embodiments, after fours of such condition, the gas turbine will runback. There is another annunciation of a higher priority (more urgent attention needed) created at three hours and forty-five minutes that the process is degraded and a runback will occur in 15 minutes. This would be considered time based escalation 128. This situation requires a diagnostic, an alert, and a higher priority alarm.

The maintenance person needs to know of the communication failure (diagnostic), the operator needs to know which process is running in a degraded condition (Alert), the operator also needs to know that additional protective actions are imminent and his action is required and urgent (Alarm Class: LVL_1 through LVL_3). There should also be a parent/child relationship of the Alert and Alarm to avoid overload of information to the operator.

Once potential alarm 107 has been categorized as the alarm annunciation type, it is prioritized, which is the process of assigning a level of operational importance to an alarm. This is accomplished by assigning an alarm class which indicates the urgency of response (e.g., seriousness of consequences and allowable response time).

Figure 2:
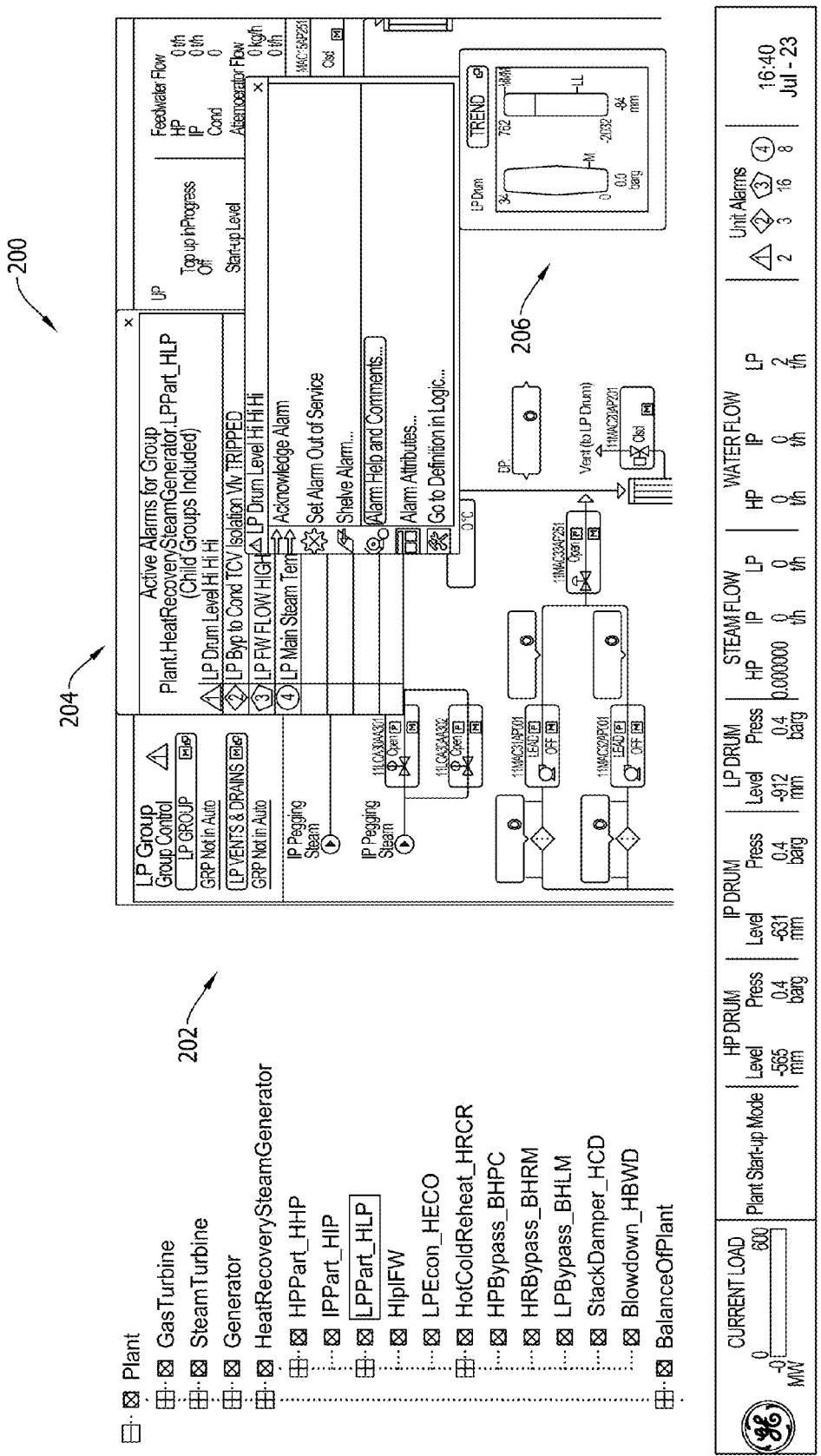

FIG. 2 is a screen capture of a plant area display 200 in accordance with an example embodiment of the present disclosure. In the example embodiment, a plant area 202 that includes a mimic display of plant equipment and a process area hierarchy 204. Process area hierarchy 204 is used in plant area display 200 via clicking the alarm icons 206 (configured with plant areas) to show alarms related to that system. It also allows statistical alarm displays to indicate problem areas in the plant. Each potential alarm is designated with a specific plant area to allow such capability in operator screens and alarm viewers.

Figure 3:
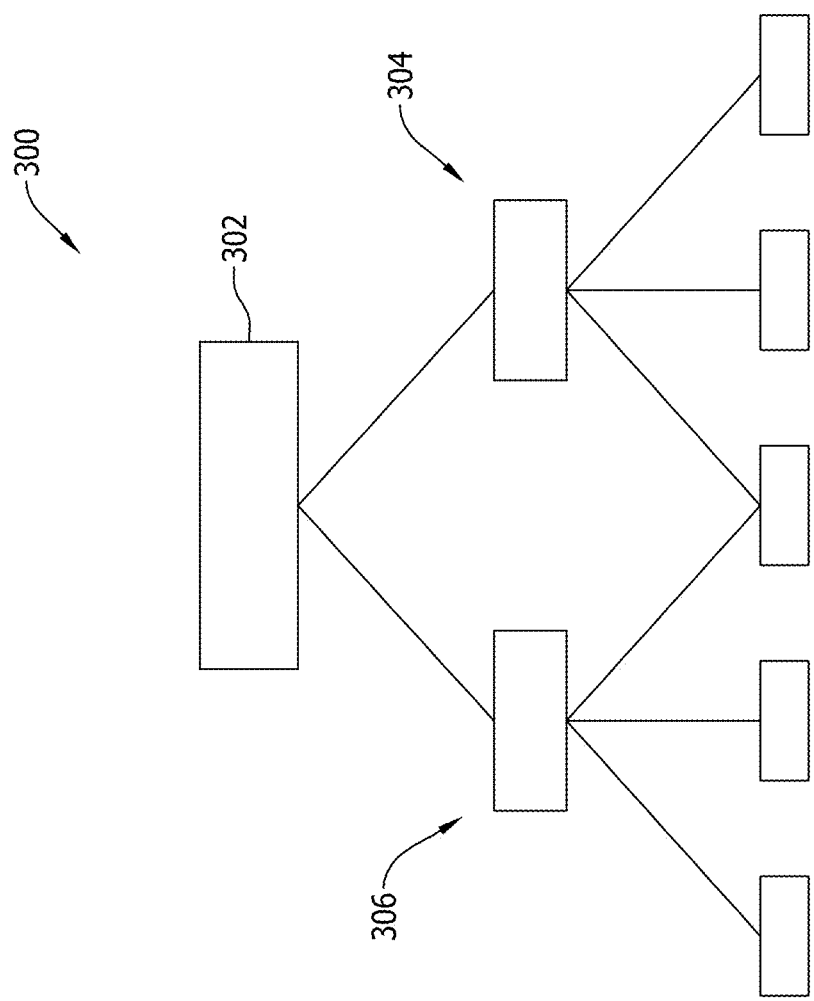

FIG. 3 is a hierarchical alarm tree 300 illustrating relationships between parent and child alarms in accordance with an example embodiment of the present disclosure. The parent-child philosophy is a way to manage a group of alarms that are linked. If an alarm 300 is dependent on a subset of other alarms 304 and/or 306, then it is possible to hide the subset because they do not add value to the operator by presenting two or more alarms that were generated by the others.

Two alarms 302, 304 or 302, 306 have a parent-child relationship if they have related causes and child alarm 304, 306 is uninformative whenever parent alarm 302 is active. Child alarm 304, 306 is uninformative because it is an inevitable consequence of parent alarm 302. If parent alarm 302 is active, child alarms 304, 306 provide no additional useful information, and may in fact be misleading about its root cause. Typically, in a parent-child group only parent alarm 302 is shown and child alarms 304, 306 are hidden (shown only on an operator request) when parent alarm 302 is active.

To comply with the herein described annunciation display philosophy, Diagnostics and Events are not used as a Parent of an Alarm or Alert annunciation type because the operator is focused primarily on alarms and secondarily on alerts. Diagnostics and Events are mainly consumed by the maintenance personnel.

Analysis of the relationship between potential alarms 107 in a system requires an in-depth system expertise and evaluation of each potential alarm. The analysis determines whether a particular alarm has a link with other potential alarms within the system. If so, determine the relation and consider re-coding the potential alarm or developing a parent child relationship. The analysis also determines whether a particular alarm can be a consequence of a different failure within system. If so, a parent child relationship is developed and/or a re-coding of the related alarms is considered as a solution. The analysis determines whether a plant event that triggered this alarm has consequences and whether other alarms within the system are triggered. If so, a parent child relationship is developed and/or a re-coding of the related alarms is performed as a solution.

The relationship between potential alarms in one system and potential alarms of different systems requires multi-system/multi-function expertise, from a team of system owners to realize the full benefit.

The relationship is used to determine whether the alarm has a link with any other system. If so, the relation is determined and a re-coding of the potential alarm or developing a parent child relationship is performed. The relationship is used to determine whether this alarm is a consequence of a failure in another system. If so, a parent child relationship is developed and/or a re-coding of the related alarms is performed as a solution. The relationship is used to determine whether the plant event that triggered this alarm has consequences and triggers alarms in other systems. If yes, a parent child relationship is developed and/or a re-coding of the related alarms is performed as a solution.

Figures 4A, 4B:
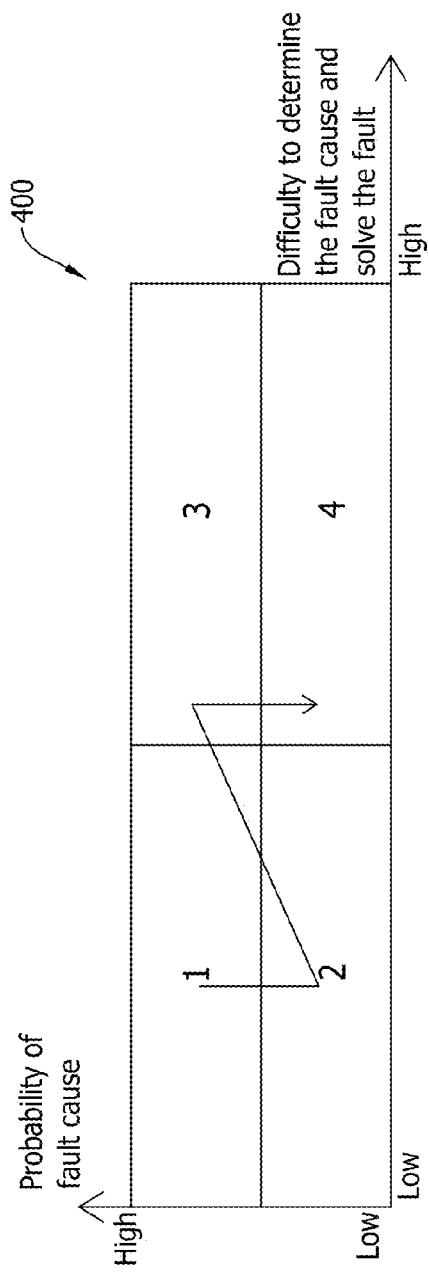
FIG. 4A is a chart illustrating an ordering of potential causes of an alarm when displayed to an operator.
FIG. 4B is an operator guidance table that is displayed on a system graphic interface.

FIG. 4A is a chart 400 illustrating an ordering of potential causes of an alarm when displayed to an operator. FIG. 4B is an operator guidance table that is displayed on a system graphic interface. In the example embodiment, chart 400 includes an x-axis 402 graduated in units of difficulty of determining a cause of a fault and a solution to the fault and a y-axis 404 graduated in units of a probability of fault cause. Using the illustrated ordering, alarms are displayed first when the cause of the fault is easy to determine to solve, and when the probability of the cause of the fault is high, as illustrated in Area 1. Next in order are alarms where the cause of the fault is easy to determine and to solve, and when the probability of the cause of the fault is low, as illustrated in Area 2. Next in order are alarms where the cause of the fault is difficult to determine and to solve, and where the probability of the cause of the fault is high, as illustrated in Area 3. Last in order are alarms where the cause of the fault is difficult to determine and to solve, and where the probability of the cause of the fault is low, as illustrated in Area 4.

Consequence of inaction 103 represents a potential consequence if the operator does not react to an alarm. Operator action describes the actions an operator should take when the alarm appears. Each operator action corresponds to a potential cause as shown in FIG. 4B. The time that it takes to execute the recommended actions also factors into an operator urgency category determination. As part of the design of potential alarm 107, an operator urgency category is determined. A high level of system expertise is used to determine how quickly an operator must act, including the length of time the corrective action may take, to avoid the consequence of the potential alarm detailed in the operator guidance portion of the design phase. The options include the following:

Not Urgent (>30 minutes)
Prompt (15 to 30 minutes)
Rapid (5 to 10 minutes)
Immediate (<5 minutes)

Several factors are considered when determining this category:

Allowable Response time—The maximum time between the annunciation of the alarm and the time the operator must take corrective action to avoid the consequence.

Although the immediate urgency category is stated as <5 minutes, there is a minimum reaction time, approximately 2 minutes to which an operator is expected to respond. Any response requirement less than 2 minutes is evaluated closely to determine if it truly actionable.

Figure 6:
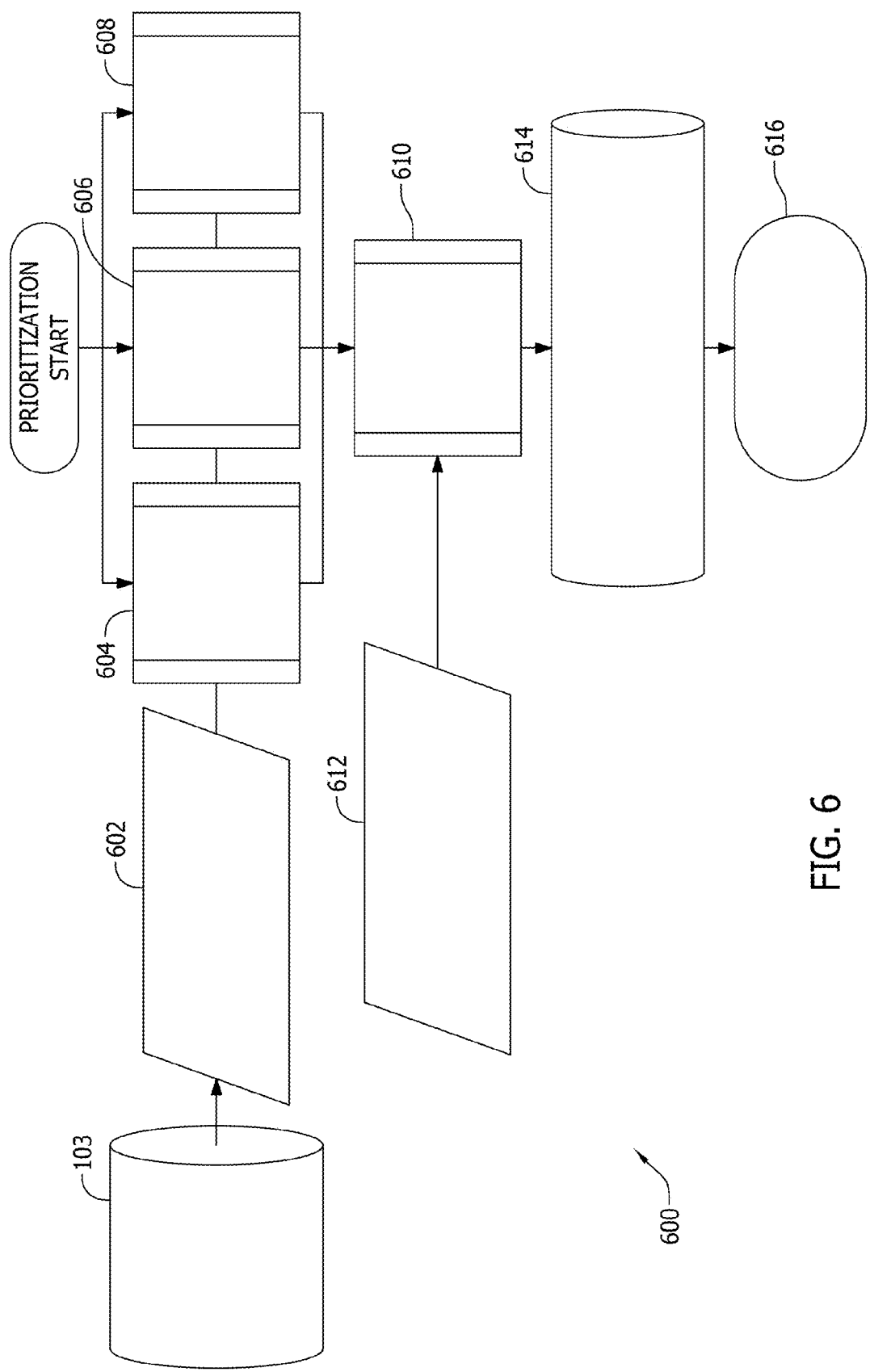

FIG. 5 is a screen capture of a format of an operator guidance 500 for alarm display that is used to set a parameters for a display such as shown in FIG. 4B. An alarm help file is used by the operator to help determine possible causes and potential actions based on the generated alarm. The alarm help file is generated from the operator guidance and other alarm definition parameters and are invoked from the alarm viewer or alarm icon on a screen. Operator guidance 500 includes an alarm name field 502, an alarm description field 504, an alarm class field, and a field 506 that indicates an area of the plant FIG. 6 is a data flow diagram 600 of alarm prioritization process 106 (shown in FIG. 1). In the example embodiment, consequence of inaction 103 is used as input to alarm prioritization process 106. Consequence of inaction 103 is evaluated using a system expertise 602 relative to each of a plurality of consequence areas. A consequence category for health and safety 604, a consequence category for environmental 606, and a consequence category for financial 608 are determined. Each category is evaluated 610 to determine the most severe consequence of categories 604, 606, and 608 using a predetermined set of consequence category severity parameters 612. In the example embodiment, set of consequence category severity parameters 612 includes at least one of minor, major, severe, and personnel parameters. The most severe of the consequence areas evaluated is entered 614 into a rationalization table/database. An alarm class is calculated 616 by the rationalization table/database to assign a level of operational importance to the alarm, which indicates the urgency of response (e.g., seriousness of consequences and allowable response time).

FIG. 7 is a severity matrix 700 for use in determining alarm priority. FIG. 8 is an example of severity matrix 700 illustrating prioritization of potential alarm 107. In the example embodiment, an alarm class is determined by evaluation of each consequence area 604, 606, and 608 to determine the worst or most severe category of the three consequence areas 604, 606, and 608. In the example embodiment, a total financial impact of greater than $500,000 is determined to be the worst case. In other embodiments, more consequence areas may be used. An operator urgency 702 is assessed, in this example a rapid operator urgency is assessed. The alarm class is selected from the intersection of the consequence category column and the operator urgency row. The alarm class is selected to be LVL_1, or a high priority alarm. In one embodiment, total financial impact is determined using a sum of equipment damage, including, for example, repair and/or outage costs, loss/reduction of generation, and degraded performance or loss of efficiency.

Figure 9:
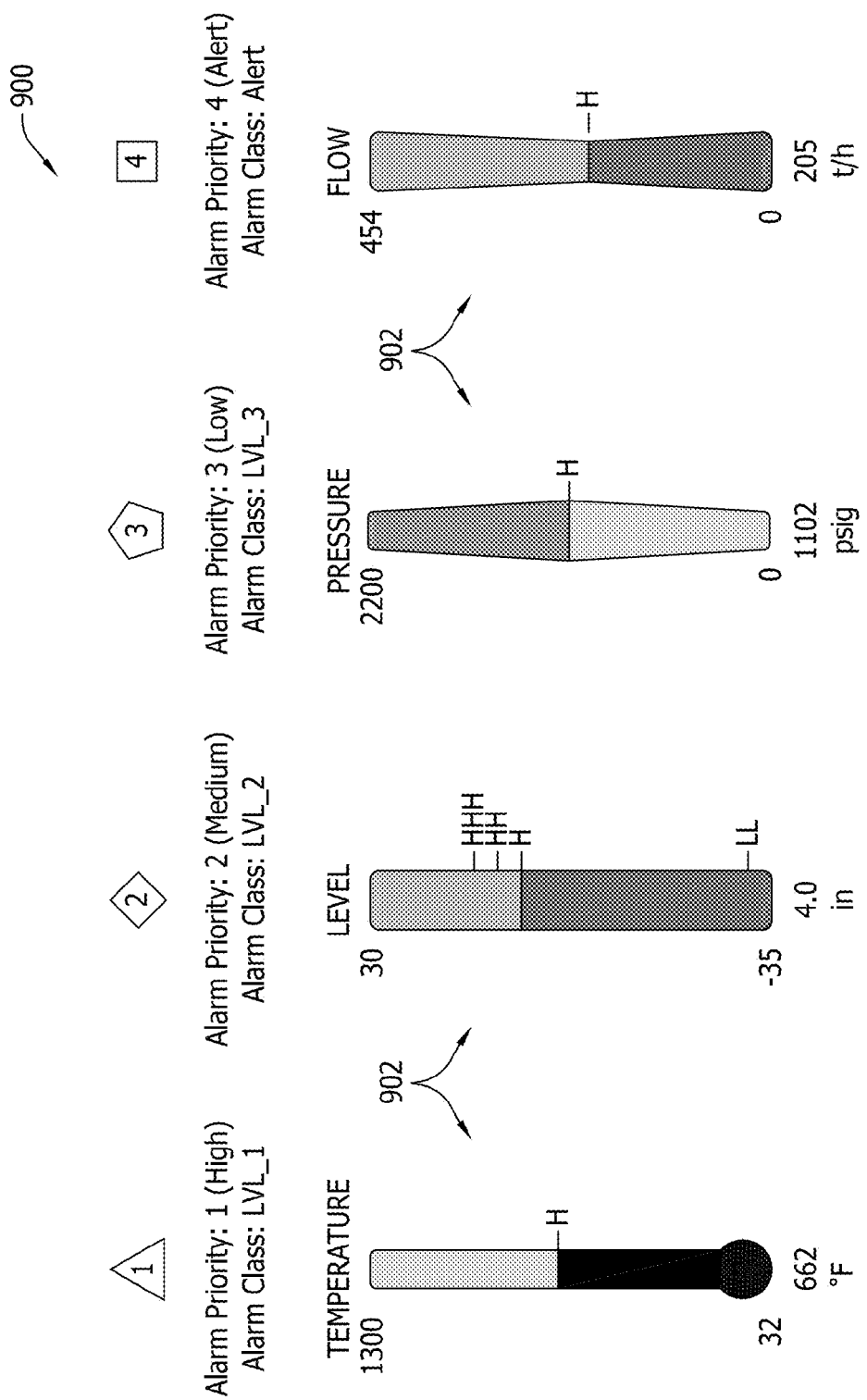

FIG. 9 is a human machine interface display 900 illustrating a use of priority in HMI display 900. The calculated alarm class drives some very important behavior in the operator screens. Important process values are depicted on bar chart type graphical objects 902. The level of alarms, in the past, drove the animation of a bar chart. This unintentionally caused the operator to have to decipher whether a "High" alarm (Yellow) in one case was extremely urgent, or in another case the same "High" alarm consequence was less urgent. In the example embodiment, bar charts 9002 are color animated per alarm priority (Alarm Class). Note all alarm levels are "High," but their urgency for attention is shown immediately.

Figure 10:
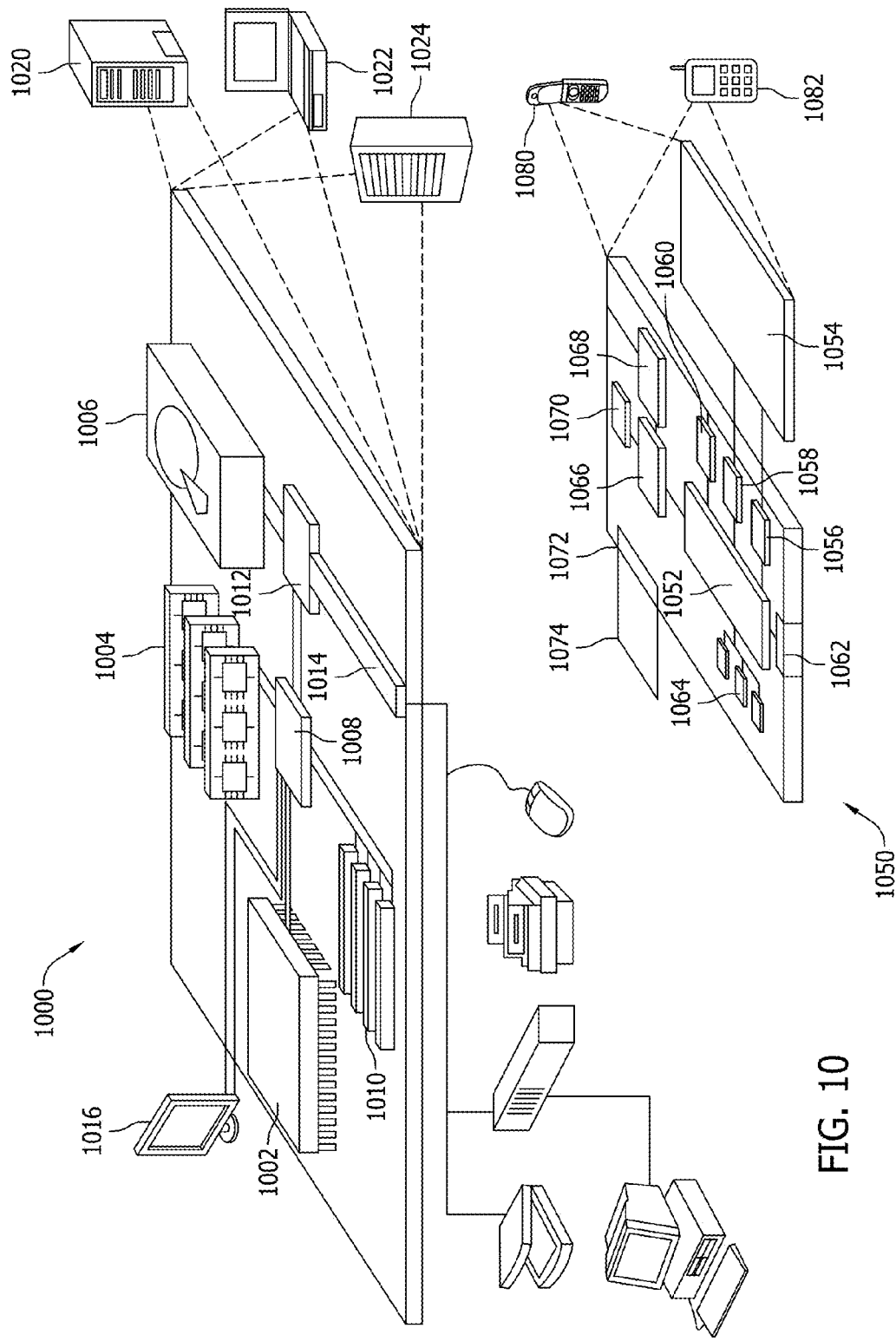

FIG. 10 is a diagram of a rationalized alarm system 1000 communicatively coupled to a mobile computing device 1050 that may be used to implement the alarm and annunciation system method shown in FIG. 1. More specifically, FIG. 10 shows an example of rationalized alarm system 1000 and mobile computing device 1050, which may be used with the techniques described herein. Rationalized alarm system 1000 may be embodied in various forms of digital computers, such as laptops, desktops, workstations, personal digital assistants, servers, blade servers, mainframes, and other appropriate computers. Computing device 1050 may be embodied in various forms of mobile devices, such as personal digital assistants, cellular telephones, smart phones, and other similar computing devices. The components shown here, their connections and relationships, and their functions, are meant to be examples only, and are not meant to limit implementations of the disclosures described and/or claimed in this document.

Rationalized alarm system 1000 includes a processor 1002, a memory 1004, a storage device 1006, a high-speed interface/controller 1008 connecting to memory 1004 and high-speed expansion ports 1010, and a low speed interface/controller 1012 connecting to a low speed bus 1014 and storage device 1006. Each of the components 1002, 1004, 1006, 1008, 1010, and 1012, are interconnected using various buses, and may be mounted on a common motherboard or in other manners as appropriate. The processor 1002 can process instructions for execution within rationalized alarm system 1000, including instructions stored in the memory 1004 or on the storage device 1006 to display graphical information for a GUI on an external input/output device, such as display 1016 coupled to high-speed interface/controller 1008. In other implementations, multiple processors and/or multiple buses may be used, as appropriate, along with multiple memories and types of memory. Also, rationalized alarm system 1000 may include multiple computing devices that may be interconnected, with each device providing portions of the necessary operations (e.g., as a server bank, a group of blade servers, or a multi-processor system).

The memory 1004 stores information within rationalized alarm system 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for rationalized alarm system 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

High-speed interface/controller 1008 manages bandwidth-intensive operations for rationalized alarm system 1000, while low speed interface/controller 1012 manages lower bandwidth-intensive operations. Such allocation of functions is example only. In one implementation, high-speed interface/controller 1008 is coupled to memory 1004, display 1016 (e.g., through a graphics processor or accelerator), and to high-speed expansion ports 1010, which may accept various expansion cards (not shown). In the implementation, low speed interface/controller 1012 is coupled to storage device 1006 and low-speed bus 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

Rationalized alarm system 1000 may be implemented in a number of different forms, as shown in FIG. 10. For example, rationalized alarm system 1000 may be implemented as a server 1020, or multiple times in a group of such servers. It may also be implemented as part of a rack server system 1024. In addition, it may be implemented in a personal computer such as a laptop computer 1022. Alternatively, components from rationalized alarm system 1000 may be combined with other components in a mobile device (not shown), such as computing device 1050. Each of such devices may contain one or more of rationalized alarm system 1000, 1050, and an entire system may be made up of multiple system components and computing devices 1000, 1050 communicatively coupled with each other.

Computing device 1050 includes a processor 1052, memory 1064, an input/output device such as a display 1054, a communication interface 1066, and a transceiver 1068, among other components. The computing device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. The processor may provide, for example, for coordination of the other components of the computing device 1050, such as control of user interfaces, applications run by computing device 1050, and wireless communication by computing device 1050.

Processor 1052 may communicate with a user through control interface 1058 and display interface 1056 coupled to a display 1054. The display 1054 may be, for example, a TFT LCD (Thin-Film-Transistor Liquid Crystal Display) or an OLED (Organic Light Emitting Diode) display, or other appropriate display technology. The display interface 1056 may include appropriate circuitry for driving the display 1054 to present graphical and other information to a user. The control interface 1058 may receive commands from a user and convert them for submission to the processor 1052. In addition, an external interface 1062 may be in communication with processor 1052, so as to enable near area communication of computing device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to computing device 1050 through expansion interface 1072, which may include, for example, a SIMM (Single In-Line Memory Module) card interface. Such expansion memory 1074 may provide extra storage space for computing device 1050, or may also store applications or other information for computing device 1050. Specifically, expansion memory 1074 may include instructions to carry out or supplement the processes described above, and may include secure information also. Thus, for example, expansion memory 1074 may be provided as a security module for computing device 1050, and may be programmed with instructions that permit secure use of computing device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052 that may be received, for example, over transceiver 1068 or external interface 1062.

Computing device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, Wi-Fi, or other such transceiver (not shown). In addition, GPS (Global Positioning system) receiver module 1070 may provide additional navigation- and location-related wireless data to computing device 1050, which may be used as appropriate by applications running on computing device 1050.

Computing device 1050 may also communicate audibly using audio codec 1060, which may receive spoken information from a user and convert it to usable digital information. Audio codec 1060 may likewise generate audible sound for a user, such as through a speaker, e.g., in a handset of computing device 1050. Such sound may include sound from voice telephone calls, may include recorded sound (e.g., voice messages, music files, etc.), and may also include sound generated by applications operating on computing device 1050.

The computing device 1050 may be implemented in a number of different forms, as shown in the figure. For example, it may be implemented as a cellular telephone 1080. It may also be implemented as part of a smart phone 1082, personal digital assistant, a computer tablet, or other similar mobile device.

Thus, various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In the example embodiment, rationalized alarm system 1000 and computing system 1052 are configured to receive and/or retrieve data pertaining to the creation, review and revision of alarm parameters, from various other computing devices connected to rationalized alarm system 1000 and computing device 1052 through a communication network, and store this data within at least one of memory 1004, storage device 1006, and memory 1064. Rationalized alarm system 1000 and computing device 1052 are further configured to manage and organize the data within at least one of memory 1004, storage device 1006, and memory 1064 using the techniques described herein.

The logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It will be appreciated that the above embodiments that have been described in particular detail are merely example or possible embodiments, and that there are many other combinations, additions, or alternatives that may be included.

Also, the particular naming of the components, capitalization of terms, the attributes, data structures, or any other programming or structural aspect is not mandatory or significant, and the mechanisms that implement the disclosure or its features may have different names, formats, or protocols. Further, the system may be implemented via a combination of hardware and software, as described, or entirely in hardware elements. Also, the particular division of functionality between the various system components described herein is merely one example, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or "providing" or the like, refer to the action and processes of a computer system, or similar electronic computing device, that manipulates and transforms data represented as physical (electronic) quantities within the computer system memories or registers or other such information storage, transmission or display devices.

Based on the foregoing specification, the above-discussed embodiments of the disclosure may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture, according to the discussed embodiments of the disclosure. The computer readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device, and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As used herein, the term "computer" and related terms, e.g., "computing device", are not limited to integrated circuits referred to in the art as a computer, but broadly refers to a microcontroller, a microcomputer, a programmable logic controller (PLC), an application specific integrated circuit, and other programmable circuits, and these terms are used interchangeably herein.

As used herein, the term "cloud computing" and related terms, e.g., "cloud computing devices" refers to a computer architecture allowing for the use of multiple heterogeneous computing devices for data storage, retrieval, and processing. The heterogeneous computing devices may use a common network or a plurality of networks so that some computing devices are in networked communication with one another over a common network but not all computing devices. In other words, a plurality of networks may be used to facilitate the communication between and coordination of all computing devices.

As used herein, the term "mobile computing device" refers to any of computing device which is used in a portable manner including, without limitation, smart phones, personal digital assistants ("PDAs"), computer tablets, hybrid phone/computer tablets ("phablet"), or other similar mobile device capable of functioning in the systems described herein. In some examples, mobile computing devices may include a variety of peripherals and accessories including, without limitation, microphones, speakers, keyboards, touchscreens, gyroscopes, accelerometers, and metrological devices. Also, as used herein, "portable computing device" and "mobile computing device" may be used interchangeably.

Approximating language, as used herein throughout the specification and claims, may be applied to modify any quantitative representation that could permissibly vary without resulting in a change in the basic function to which it is related. Accordingly, a value modified by a term or terms, such as "about" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processors 1002, 1052 and by devices that include, without limitation, mobile devices, clusters, personal computers, workstations, clients, and servers, including RAM memory, ROM memory, EPROM memory, EEPROM memory, and non-volatile RAM (NVRAM) memory. The above memory types are examples only, and are thus not limiting as to the types of memory usable for storage of a computer program.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

As will be appreciated based on the foregoing specification, the above-described embodiments of the disclosure may be implemented using computer programming or engineering techniques including computer software, firmware, hardware or any combination or subset thereof, the technical effect of the methods and systems may be achieved by performing at least one of the following steps: (a) receiving parameters relating to a potential alarm, (b) receiving an indication of a plant event, comparing the received indication to the received parameters, and displaying a notification of the potential alarm as at least one of an Event, a Diagnostic, an Alert, and an Alarm based on the comparison and in accordance with the received parameters. Any such resulting program, having computer-readable code means, may be embodied or provided within one or more computer-readable media, thereby making a computer program product, i.e., an article of manufacture, according to the discussed embodiments of the disclosure. The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

Many of the functional units described in this specification have been labeled as modules, to more particularly emphasize their implementation independence. For example, a module may be implemented as a hardware circuit including custom very large scale integration ("VLSI") circuits or gate arrays, off-the-shelf semiconductors such as logic chips, transistors, or other discrete components. A module may also be implemented in programmable hardware devices such as field programmable gate arrays (FPGAs), programmable array logic, programmable logic devices (PLDs), or the like.

Modules may also be implemented in software for execution by various types of processors. An identified module of executable code may, for instance, include one or more physical or logical blocks of computer instructions, which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The above-described embodiments of a method and system for rationalizing alarms provides a cost-effective and reliable means for providing a highly managed alarm feature including at least a parent/child association between potential alarms. More specifically, the methods and systems described herein facilitate reducing an operator sensory load by reducing annunciated alarms to those that have been properly designed, categorized, and prioritized. In addition, the above-described methods and systems facilitate making the annunciations available to a proper party in a predetermined timeframe. As a result, the methods and systems described herein facilitate operator action during plant events in a cost-effective and reliable manner.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A rationalized process plant alarm system comprising:
a memory device;
one or more processors communicatively coupled to said memory device, said one or more processors programmed to:
  receive a set of design parameters relating to a potential alarm;
  evaluate the set of design parameters of the potential alarm in a design phase of an alarm rationalization process;
  categorize the potential alarm as an event or a diagnostic, which relates to maintenance and diagnosis of the plant, or as an alert or an alarms, which relates to normal or abnormal operations;
  prioritize the potential alarm by determining an alarm class for the potential alarm which indicates the urgency of response based on a seriousness of consequences of inaction and an allowable response time;
  receive an indication of a plant event from at least one of a plurality of field devices;
  compare the received indication to the received set of design parameters; and display a notification of the potential alarm using the determined alarm class as at least one of an event, a diagnostic, an alert, and an alarm based on the comparison and in accordance with the received set of design parameters.

2. The alarm system of claim 1, wherein the received set of design parameters include at least one of an active condition parameter, which indicates operating conditions for which the potential alarm is applicable, a triggering event parameter, which describes logic that triggers the potential alarm, and an alarm setpoint parameter, which indicates a threshold value that triggers an alarm when exceeded.

3. The alarm system of claim 1, wherein the received set of design parameters include a shelving parameter, which defines a shelving mechanism for the potential alarm, the shelving mechanism is initiated by an operator to temporarily suppress a generated alarm or alert, the shelving parameter includes a maximum duration of a shelve period, the maximum shelf time determined using an allowable response time and an urgency category.

4. The alarm system of claim 1, wherein said one or more processors are programmed to receive set of design parameters relating to a potential alarm during a design phase of an alarm rationalization process, the design phase including at least one of pre-checking of potential alarms in a system to determine if a potential alarm meets a criteria of being an alert or an alarm, defining the potential alarms, determining a relationship of potential alarms within a given system, and determining an operator guidance including a determination of a specific action to take in response to an alarm and an urgency with which an operator needs to act to avoid a consequence of inaction.

5. The alarm system of claim 1, wherein said one or more processors are programmed to categorize potential alarms as Events, Diagnostics, Alerts or Alarms by separating potential alarms into annunciation types based on common requirements.

6. The alarm system of claim 5, wherein the common requirements include at least one of an event annunciation type, a diagnostic annunciation type, an alert annunciation type, an alarm annunciation type, an allowable response time between an annunciation of the alarm and the time an operator must take corrective action to avoid a consequence of inaction, and whether the potential alarm is actionable.

* * * * *